(12) United States Patent
Takahashi et al.

(10) Patent No.: US 7,786,642 B2
(45) Date of Patent: Aug. 31, 2010

(54) ROTATING MACHINERY

(75) Inventors: Kazuhiko Takahashi, Hitachi (JP);
Kenichi Hattori, Hitachiota (JP);
Masami Sukeda, Takahagi (JP); Atsushi Ishihara, Hitachinaka (JP); Takahiko Sano, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/619,777

(22) Filed: Jan. 4, 2007

(65) Prior Publication Data
US 2007/0152520 A1 Jul. 5, 2007

(30) Foreign Application Priority Data

Jan. 4, 2006 (JP) .............................. 2006-000019

(51) Int. Cl.
*H02K 1/00* (2006.01)
(52) U.S. Cl. .................. 310/184; 310/71; 310/198; 310/201; 310/234; 310/182; 310/203; 174/70 R; 174/75 R
(58) Field of Classification Search ................ 310/184, 310/198, 201, 71, 12, 182, 210, 234, 203; 174/70 R, 75 R
See application file for complete search history.

(56) References Cited

U.S. PATENT DOCUMENTS

| | | | | | |
|---|---|---|---|---|---|
| 3,192,423 | A | * | 6/1965 | Pearson | 310/201 |
| 4,028,572 | A | * | 6/1977 | Baltisberger | 310/201 |
| 4,678,931 | A | * | 7/1987 | Olsen et al. | 310/205 |
| 5,722,153 | A | * | 3/1998 | Holmes et al. | 29/598 |
| 5,995,362 | A | * | 11/1999 | Morel et al. | 361/647 |
| 6,476,530 | B1 | * | 11/2002 | Nakamura et al. | 310/201 |

(Continued)

FOREIGN PATENT DOCUMENTS

CH    172177    9/1934

(Continued)

OTHER PUBLICATIONS

"Herstellung der Wicklungen electrischer Maschinen" by H. Sequentz, Japanese translation, Published. Jan. 1, 1990, Kaihatsusha.

(Continued)

*Primary Examiner*—Quyen Leung
*Assistant Examiner*—John K Kim
(74) *Attorney, Agent, or Firm*—Antonelli, Terry, Stout & Kraus, LLP.

(57) ABSTRACT

In a rotating machinery having armature windings constituted by a lot of strands, when the armature winding is constituted by four layers, a step number of the strands becomes half with respect to two layers of armature windings so as to facilitate manufacturing an armature winding of 540 degree transposition in which a transposition pitch is elongated and a circulating current loss is reduced, but since an output voltage becomes twice, for securing a voltage limit value caused by an isolation resisting force, one layer of armature windings are constituted by sub windings separated into at least two layers in a vertical direction, a transposition is independently applied to each of the sub windings, the sub windings are connected to the armature windings of the other slot while keeping an isolation of the sub winding at an armature winding end region by at least two connecting methods, and the sub winding constructs a parallel circuit by the armature windings of a plurality of slots.

7 Claims, 17 Drawing Sheets

U.S. PATENT DOCUMENTS

| | | | |
|---|---|---|---|
| 6,995,492 B1 * | 2/2006 | Kouda et al. | 310/254.1 |
| 7,268,455 B2 * | 9/2007 | Kouda et al. | 310/184 |
| 2001/0040416 A1 * | 11/2001 | Nakamura et al. | 310/201 |
| 2003/0214196 A1 * | 11/2003 | Cai et al. | 310/208 |
| 2005/0108870 A1 * | 5/2005 | Harada et al. | 29/606 |
| 2006/0006757 A1 * | 1/2006 | Seguchi | 310/184 |
| 2006/0267439 A1 * | 11/2006 | Rajasingham | 310/179 |

FOREIGN PATENT DOCUMENTS

| | | |
|---|---|---|
| DE | 377610 | 6/1923 |
| DE | 1005611 | 4/1957 |
| JP | 2001-069707 | 3/2001 |
| JP | 2002-199633 | 7/2002 |

OTHER PUBLICATIONS

Official Action issued in European Patent Application No. 07000114.4 on Feb. 5, 2009.

* cited by examiner

Slot region

ROTATING MACHINERY

FIELD OF THE INVENTION

The present invention relates to an armature winding of a rotating machinery.

DESCRIPTION OF RELATED ART

In a rotating machinery, a lot of slots extending in an axial direction are provided in an inner circumferential portion of a stator core, and an armature winding is accommodated within the slots. In the case that an alternating current flows through the armature winding, an alternating current loss is generated in the armature winding by a magnetic flux forming a linkage with the armature winding within the slot and in an end region of the winding. The alternating current loss causes a temperature rise of the armature winding and an efficiency reduction of the rotating machinery, and it is a purpose for reducing the alternating current loss so as to improve a reliability of the rotating machinery and to improve the efficiency. With respect to the purpose, the alternating current loss is reduced by constructing the armature winding by a plurality of insulated strands and twisting the strands of the armature winding in an axial direction of the rotating machinery so as to apply a transposition (for example, see "Herstellung der Wicklungen electrischer Maschinen" by H. Sequentz, Japanese Translation, Published. 1990 Jan. 1, Kaihatsusha). The alternating current loss can be divided into an eddy current loss generated by the magnetic flux forming the linkage with the strand itself, and a circulating current loss circulating the strand by the magnetic flux forming the linkage between the strands.

The reduction of the eddy current loss can be achieved by making a thickness of the strand thin and increasing a stage number of the strands constituting the armature winding.

The circulating current loss depends on an angle transposing the strand. An angle of transposition of the strand is called as a 360 degree transposition in the case that the strand is twisted at one rotation between both ends of the slot, and is called as a 540 degree transposition in the case that the strand is twisted at one and half rotation between both the ends of the slot. In the 360 degree transposition, since a linkage flux of the winding end portion of the armature is applied in both end portions, a circulating current is generated more than a little. In the 540 degree transposition, since the linkage flux formed by its own armature winding remains, the circulating current flows, however, since the linkage fluxes formed by the other armature windings are canceled, the circulating current becomes smaller in comparison with the 360 degree transposition. As mentioned above, in order to reduce the circulating current loss, it is effective to employ the 540 degree transposition. However, the 540 degree transposition has a portion in which a pitch of transposition is shorter in comparison with the 360 degree transposition.

Two layers of armature windings are provided in one slot, and the armature winding in an inner diameter side and the armature winding in an outer diameter side are electrically connected at the end region of the armature winding by a connector so as to be connected to the armature winding in the other slot.

In the rotating machinery having the structure mentioned above, in order to reduce the eddy current loss, it is effective to make the thickness of the strand thin and increase the stage number of the strands constituting the armature winding, however, since the pitch of the transposition becomes shorter on the basis of the increase of the stage number of the strand, it is not easy to manufacture the armature winding of the 540 degree transposition, and the circulating current loss is increased in the 360 degree transposition having the longer pitch of the transposition. As mentioned above, the eddy current loss and the circulating current loss are in a trade-off relation, and there exists a problem that it is hard to simultaneously reduce both of the eddy current loss and the circulating current loss.

With respect to the problem, there is a structure in which four layers of armature windings are formed in a vertical direction within one slot (for example, see JP-A-2001-69707, page 13, and FIG. 4, and JP-A-2002-199633, page 7, FIG. 2). Accordingly, since the stage number of the strand becomes half in comparison with the armature winding constituted by two layers, the pitch of transposition becomes twice, and it is possible to apply the armature winding of 540 degree transposition.

In the rotating machinery having the structure mentioned above, since the four layers of armature windings are connected in series, the winding number becomes twice in comparison with the structure constituted by two layers, and a voltage is output twice. Further, since a cross section area of one winding becomes half, a current density is identical between the two-layers structure and the four-layers structure although a current value is half.

In the armature winding, a maximum voltage is limited by a dielectric strength of an insulator, and a maximum current density is limited by a temperature of the winding. In this case, if the voltage and the current density are designed by limit values in the structure in which the armature winding is constituted by two layers, the current density is the limit value but the voltage becomes twice the limit value in the four-layers structure, so that there is a problem that the four-layers structure is not established.

BRIEF SUMMARY OF THE INVENTION

In order to solve the problem mentioned above, in accordance with the present invention, it is characterized in that one layer of armature machinery is constituted by at least two layers of sub windings in a vertical direction, and these sub windings are structured by a parallel circuit.

In the present invention, since two layers or more of sub windings constitute the parallel circuit, it is possible to secure the same limit value of the voltage value as that of the one-layer armature winding. Further, since the stage number of the sub windings becomes equal to or less than a half of the one-layer armature winding, the 540 degree transposition can be applied even if the thickness of the strand is made thin so as to increase the stage number, whereby it is possible to reduce both of the eddy current loss and the circulating current loss. Further, since a height of the sub winding in a radial direction becomes equal to or less than half, the magnetic flux forming the linkage with the sub winding becomes small, and the circulating current loss can be further reduced.

Other objects, features and advantages of the invention will become apparent from the following description of the embodiments of the invention taken in conjunction with the accompanying drawings.

DETAILED DESCRIPTION OF THE INVENTION

A description will be in detail given below of a rotating machinery in accordance with the present invention on the basis of illustrated embodiments.

Figure 8:
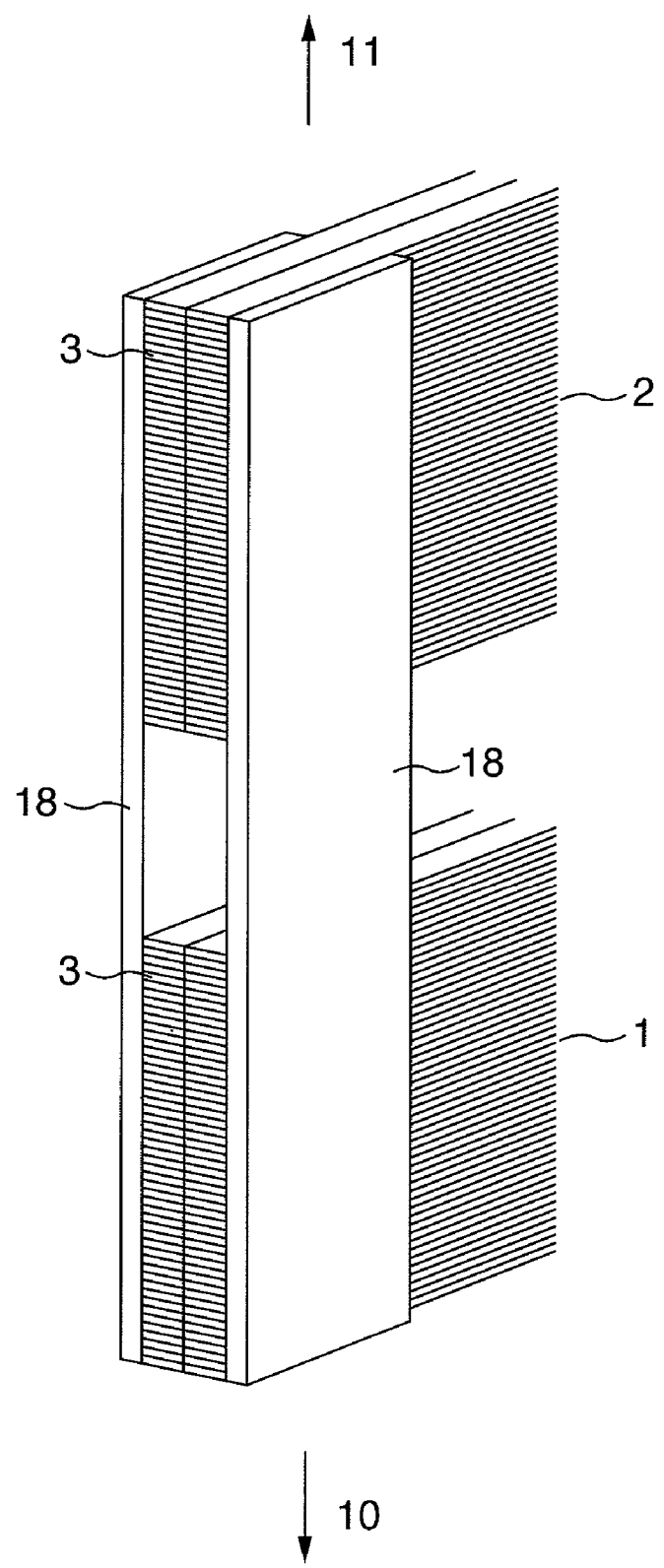
FIG. 8 is a perspective view of an armature winding end portion showing a conventional example.

FIG. 8 shows a perspective view of a conventional armature winding end portion. A lot of armature winding end portions exist in a rotating machinery, and FIG. 8 shows one of them. The armature winding is constituted by an armature winding 1 on an inner diameter side 10 and an armature winding 2 on an outer diameter side 11, and the armature winding 1 and the armature winding 2 are constituted by a plurality of strands 3. Each of the strands 3 is electrically short circuited by brazing or the like in the armature winding end portion, and the armature winding 1 and the armature winding 2 are electrically connected by a connector 18 in accordance with the brazing or the like.

Embodiment 1

Figure 1:
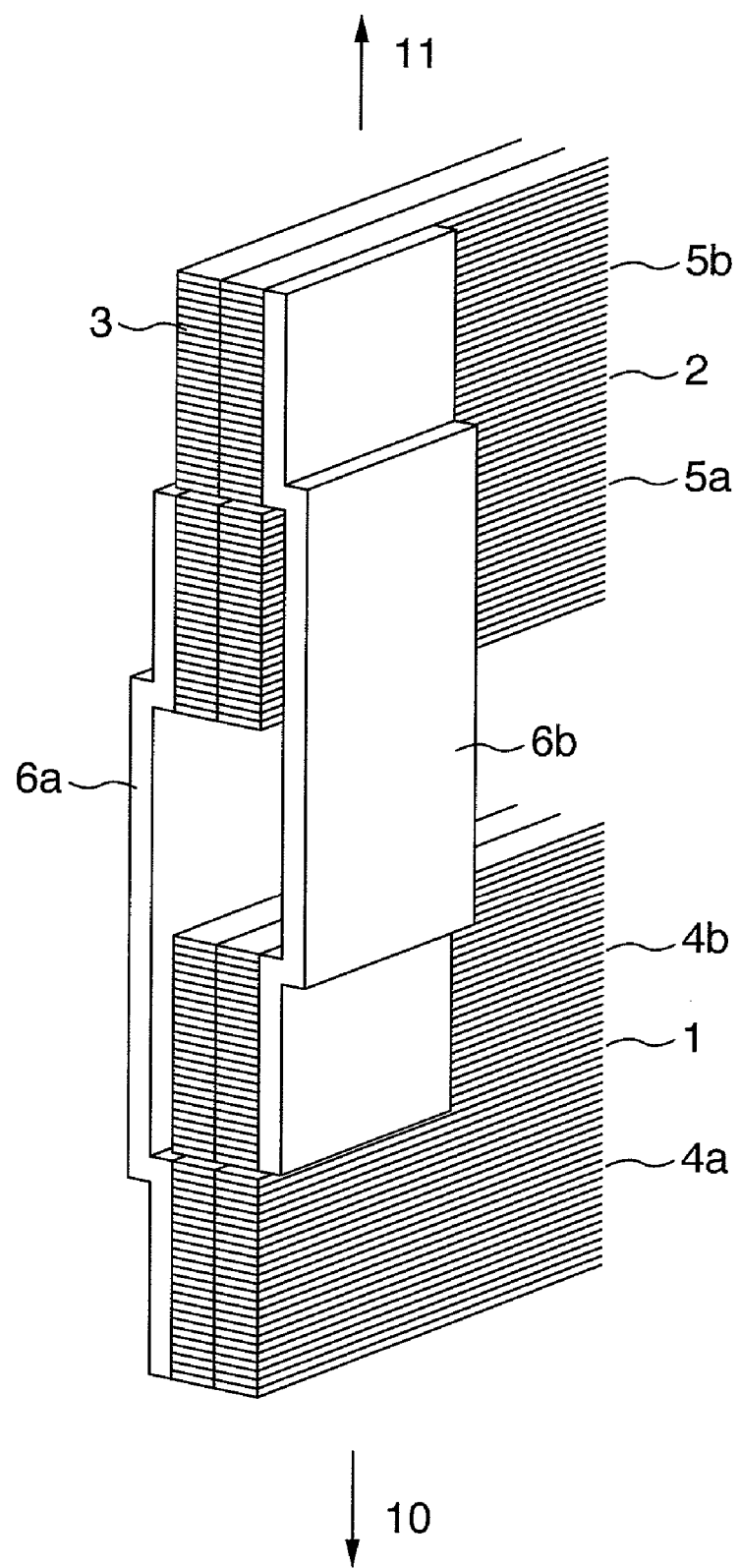
FIG. 1 is a perspective view of an armature winding end portion showing a first embodiment in accordance with the present invention.
Figure 2:
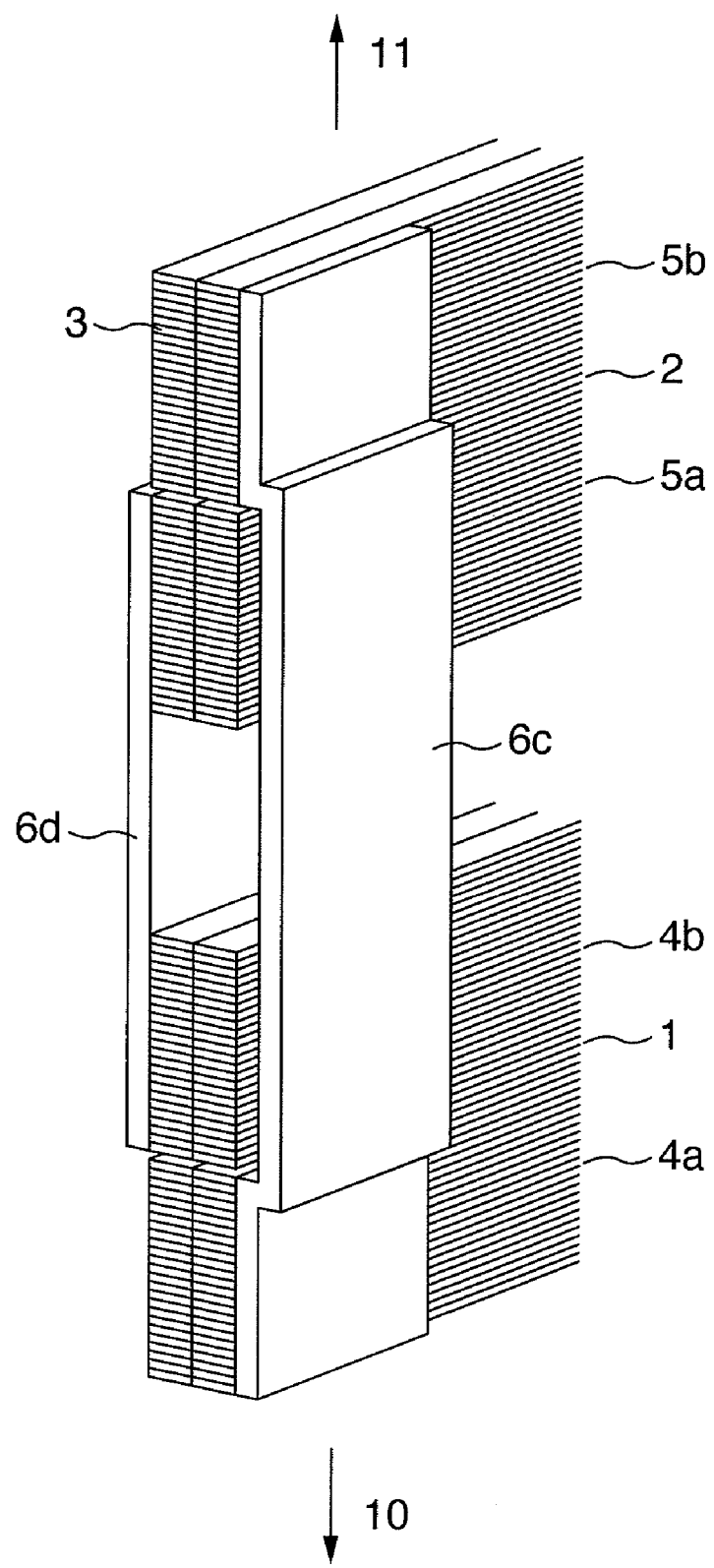
FIG. 2 is a perspective view of the armature winding end portion showing the first embodiment in accordance with the present invention.
Figure 3A:
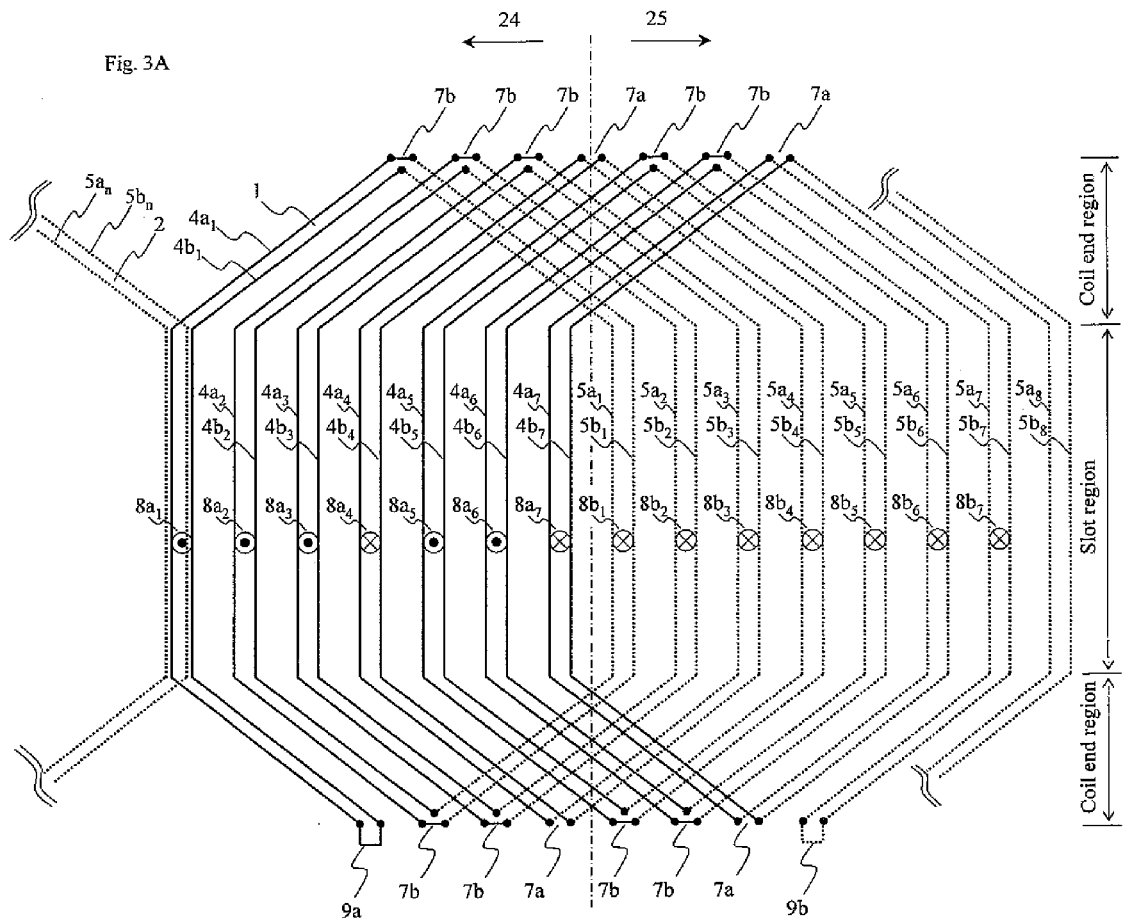
FIGS. 3A-3C illustrate an example of a wire connection view in the case of being constructed by the sub windings existing in a plurality of slots in accordance with the present invention.
Figure 3B:
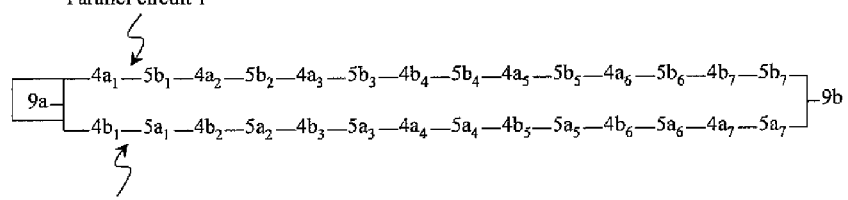
Figure 3C:
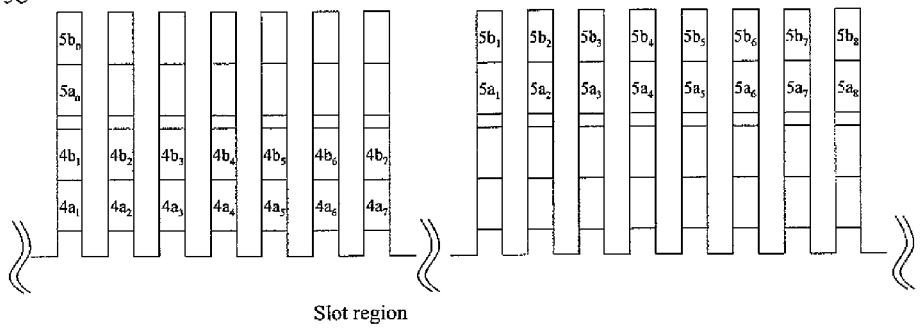

FIGS. 1, 2 and 3 show a first embodiment in accordance with the present invention.

Figure 18:
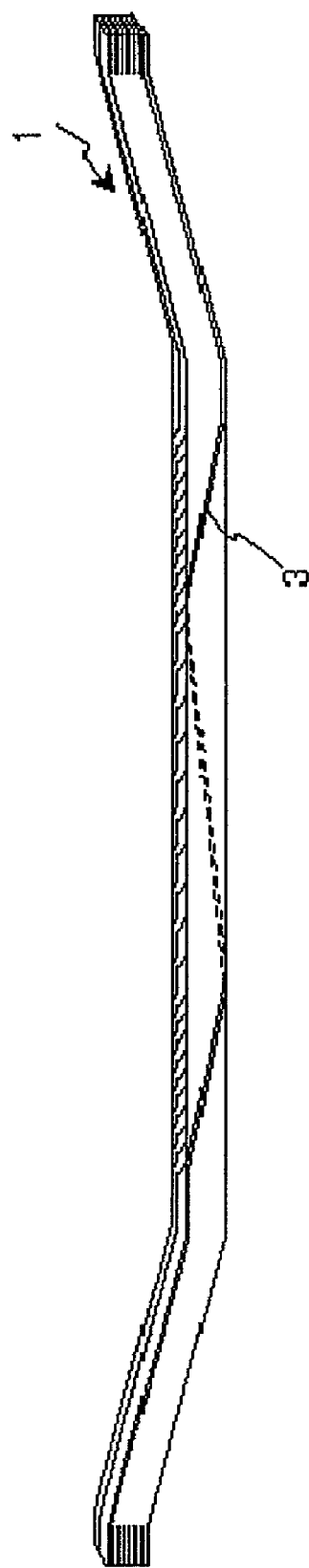
FIG. 18 illustrates a transposition angle of a strand.

The armature winding is constituted by the armature winding 1 on the inner diameter side 10 and the armature winding 2 on the outer diameter side 11, and the armature winding 1 and the armature winding 2 in accordance with the present embodiment are structured such that the strands are arranged in two rows. The armature winding 1 is separated into two layers so as to comprise a sub winding 4a and a sub winding 4b in a vertical direction. Further, the armature winding 2 is also separated into two layers so as to comprise a sub winding 5a and a sub winding 5b in a vertical direction. It is desirable that stage numbers of the strands of the sub winding 4a and the sub winding 4b are equal to each other, however, the stage numbers of the strands may be different. In the same manner, it is desirable that stage numbers of the strands of the sub winding 5a and the sub winding 5b are equal to each other, however, the stage numbers of the strands may be different. The sub winding 4a and the sub winding 4b are electrically isolated via a spacer (not shown). Further, the sub winding 5a and the sub winding 5b are also electrically isolated via a spacer (not shown). Further, the sub winding 4a, the sub winding 4b, the sub winding 5a and the sub winding 5b independently transpose the strands, respectively. An angle of transposition is set to be equal to or more than 360 degrees, however, it is preferably effective for reducing a loss that the sub winding is set to 540 degree transposition, as shown in FIG. 18. Further, each of the sub winding 4a and the sub winding 4b, and the sub winding 5a and the sub winding 5b applies a current as a parallel circuit.

In the armature winding end portion, if the armature winding 1 and the armature winding 2 are connected by the conventional connector, the sub winding 4a and the sub winding 4b are electrically short circuited. In the connection mentioned above, since the transposition is not formed between the sub winding 4a and the sub winding 4b, a great circulating current flows between the sub winding 4a and the sub winding 4b, and a circulating current loss is increased. In the same manner, a great circulating current loss is generated in the sub winding 5a and the sub winding 5b.

In the present invention, there is employed a system of connecting while keeping the electrical isolation between the sub winding 4a and the sub winding 4b and between the sub winding 5a and the sub winding 5b, for connecting the armature winding 1 and the armature winding 2.

In FIG. 1, the sub winding 4a of the armature winding 1 on the inner diameter side 10 is connected to the sub winding 5a of the armature winding 2 on the inner diameter side 10 by a connector 6a. The connector 6a is set to a stepped structure so as to prevent the sub winding 4a and the sub winding 4b from being short circuited. In order to further secure the isolation, a spacer (not shown) may be provided between the connector 6a and the sub winding 4b. Further, the sub winding 4b of the armature winding 1 on the outer diameter side 11 is connected to the sub winding 5b of the armature winding 2 on the outer diameter side 11 by a connector 6b. The connector 6b is also set to the stepped structure so as to prevent the sub winding 5a and the sub winding 5b from being short circuited. In order to further secure the isolation, a spacer (not shown) may be provided between the connector 6b and the sub winding 5a. A linkage flux (not shown) between the sub winding 4a and the sub winding 4b and a linkage flux (not shown) between the sub winding 5a and the sub winding 5b have the same direction, and the connection in FIG. 1 is called as a positive connection.

In FIG. 2, the sub winding 4a of the armature winding 1 on the inner diameter side 10 is connected to the sub winding 5b of the armature winding 1 on the outer diameter side 11 via a connector 6c. The connector 6c is set to a stepped structure so as to prevent the sub winding 4a and the sub winding 4b, and the sub winding 5a and the sub winding 5b from being short circuited. In order to further secure the isolation, a spacer (not shown) may be provided between the connector 6c and the sub winding 4b, and between the connector 6c and the sub winding 5a. Further, the sub winding 4b of the armature winding 1 on the outer diameter side 11 is connected to the sub winding 5a of the armature winding 2 on the inner diameter side 10 by a connector 6d. The connector 6d may not be set to the stepped structure. A linkage flux (not shown) between the sub winding 4a and the sub winding 4b and a linkage flux (not shown) between the sub winding 5a and the sub winding 5b have the inverse direction, and the connection in FIG. 2 is called as a negative connection.

The magnetic flux (not shown) forming the linkage between the sub windings of the armature winding 1 is different from that of the armature winding 2. Further, the magnetic flux forming the linkage between the sub windings of the armature windings 2 has almost the same value in all the slots, however, the linkage flux in an in-phase slot (not shown) is different from that in an out-of-phase slot (not shown) in the armature winding 1. Then, it is possible to reduce the circulating current between the sub windings by constructing the sub windings existing in a plurality of slots by a parallel circuit, and combining the positive connection in FIG. 1 and the negative connection in FIG. 2 so as to cancel the linkage flux between the sub windings.

FIGS. 3A and 3B illustrate an example of a wire connection view in the case of being constructed by the sub windings existing in a plurality of slots. On a circumferential direction 24 side in FIG. 3A, the armature winding 1 on the inner diameter side is indicated by a solid line, and on a circumferential direction 25 side, the armature winding 2 in the outer diameter side is indicated by the broken line. Armature winding 1 and armature winding 2 each form a circuit, with circuit 1 being parallel to circuit 2. Each of the sub windings 4a, 4b of the armature core 1 has seven sub windings, respectively that is, $4a_1$ to $4a_7$, $4b_1$ to $4b_7$, and each of the sub windings 5a, 5b of the armature core 2 has seven sub windings, respectively, that is $5a_1$ to $5a_7$, $5b_1$ to $5b_7$. Each of the sub winding 4a, the sub winding 4b, the sub winding 5a and the sub winding 5b are respectively connected at the armature winding end portions by using the positive connection 7a and the negative connection 7b. A combination between the positive connection 7a and the negative connection 7b may be determined in such manner that a total value of the linkage fluxes $8a1$ to $8a7$ and $8b1$ to $8b7$ between the sub windings becomes small. As a concrete connecting example, as shown in FIG. 3B, the first connected portion 1 of the first parallel circuit is made up of $4a_1$, $5b_1$, $4a_2$, $5b_2$, $4a_3$, $5b_3$, $4a_4$, $5b_4$, $4a_5$, $5b_5$, $4a_6$, $5b_6$, $4b_7$, and $5b_7$, and the second connected portion 2 of the second parallel circuit is made up of $4b_1$, $5a_1$, $4b_2$, $5a_2$, $4b_3$, $5a_3$, $4a_4$, $5a_4$, $4b_5$, $5a_5$, $4b_6$, $5a_6$, $4a_7$, and $5a_7$. Further, an endmost portion 9a of the armature winding 1 electrically connects the sub winding $4a_1$ and the sub winding $4b_1$, and the sub winding $5a_1$ and the sub winding $5b_1$ are electrically connected by an endmost portion 9b of the armature winding 2, whereby the sub windings form the parallel circuit between the endmost portion 9a and the endmost portion 9b. A combination between the positive connection 7a and the negative connection 7b may be determined in such a manner that a total value of the linkage fluxes 8a and 8b between the sub windings constructing the parallel circuit existing between the endmost portions 9a and 9b becomes small.

A way of selecting a plurality of slots constructing one parallel circuit is optional, however, if the slots are selected from an in phase neutral point side to a line side, the circulating current between the sub windings is in common in all the armature windings from the neutral point side to the line side, and an advantage is obtained in the respect that the loss is easily balanced.

Figure 4:
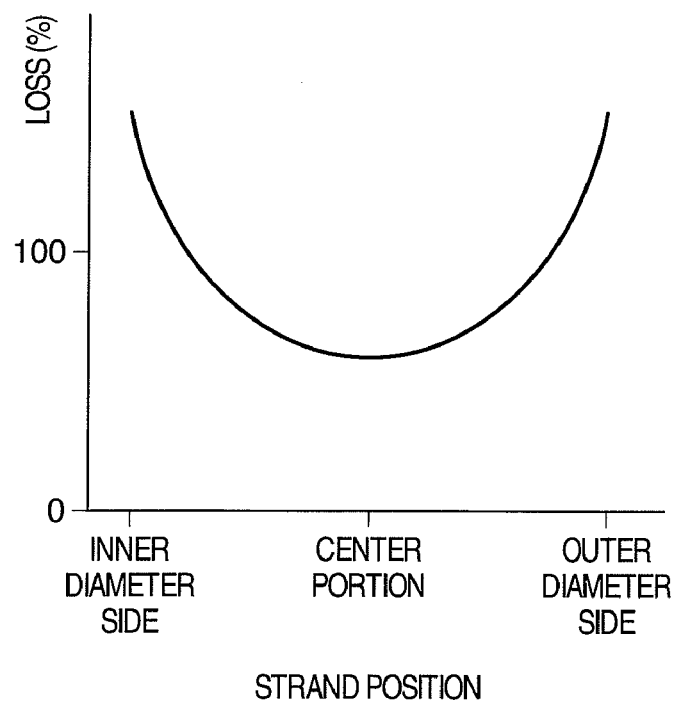
FIG. 4 is a loss distribution view of a strand in accordance with a conventional example.

FIG. 4 shows a data of a loss obtained by summing up the direct load loss and the circulating current loss of the conventional armature winding. An abscissa axis corresponds to a position of each of the strands, and shows a loss distribution with respect to the positions of the strands. The loss is small in a center portion in the radial direction of the strand, however, the losses on the inner diameter side and the outer diameter side become greater due to an influence of the circulating current.

Figure 5:
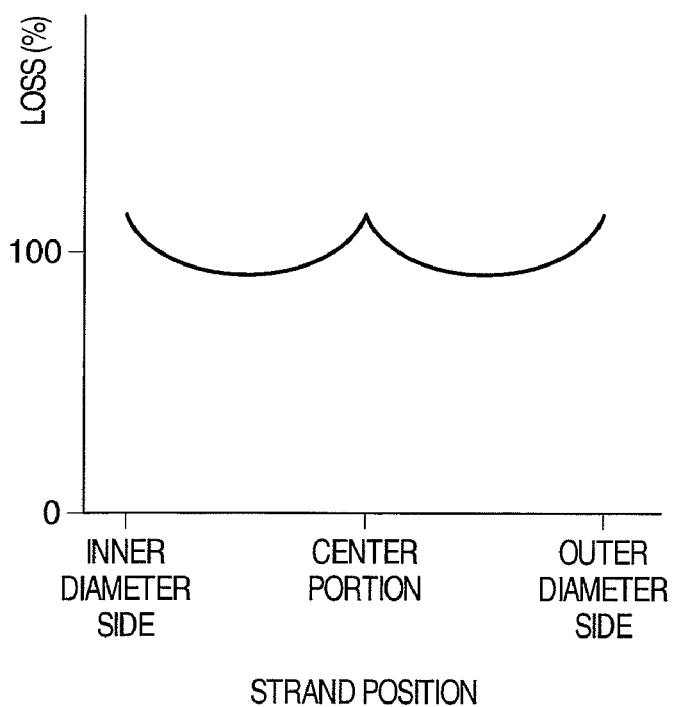
FIG. 5 is a loss distribution view of a strand in accordance with the first embodiment of the present invention.

FIG. 5 shows a data of the loss of the present invention in the structures shown in FIGS. 1, 2 and 3. It is understood that a height of the armature winding becomes half, whereby the linkage flux becomes small and the circulating current loss is reduced.

Figure 6:
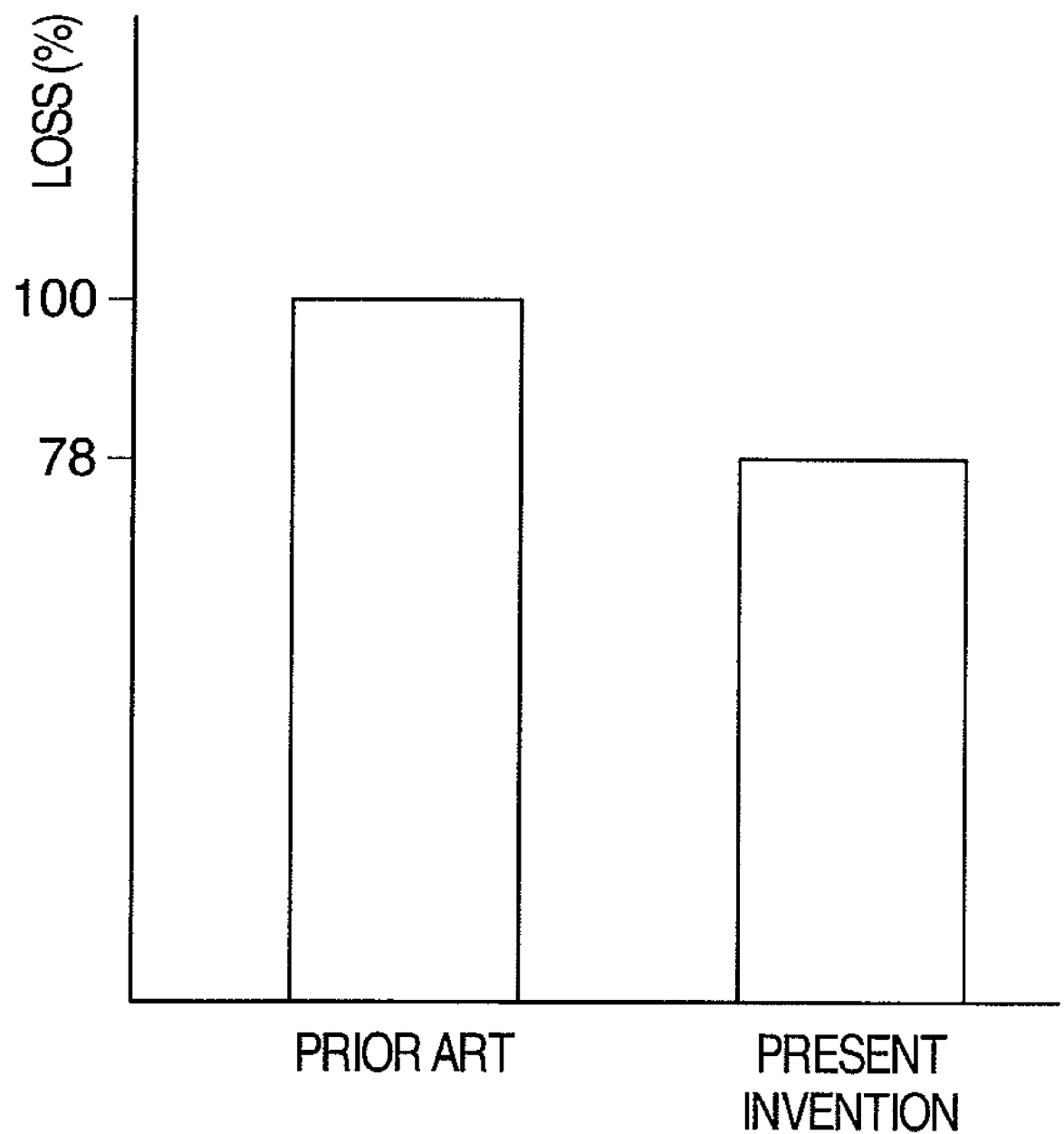
FIG. 6 is a comparative view of a loss between the conventional example and the present invention.

FIG. 6 shows a data of a loss total value of a direct load loss, a circulating current loss and an eddy current loss of the armature winding. If the conventional loss is set to 100%, the loss becomes 78% in the present invention, and 22% loss reduction effect can be obtained. In FIG. 6, a thickness of the strand is set identical between the conventional structure and the present invention, however, since the present invention can make the thickness of the strand thin, the eddy current loss can be reduced by thinning the strand, and it is possible to expect a further loss reduction.

Figure 7:
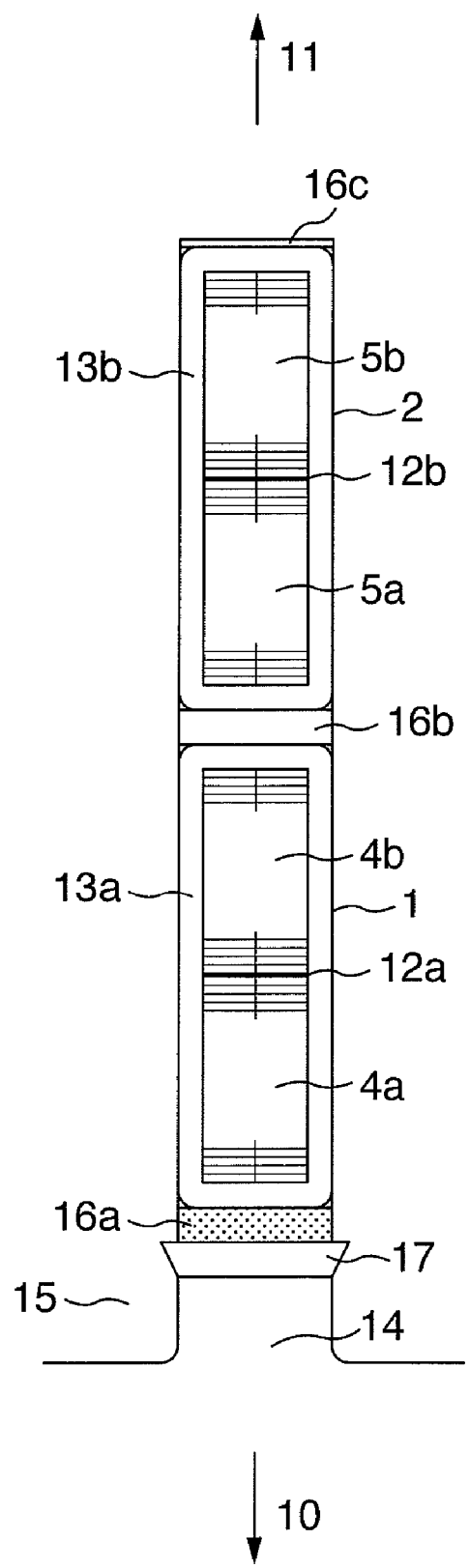
FIG. 7 is a cross sectional view showing a structure of an armature winding in an inner portion of a slot in accordance with the present invention.

FIG. 7 is a cross sectional view showing a structure of the armature winding in an inner portion of a slot 14 provided in a tooth 15. The sub winding 4a and the sub winding 4b are electrically isolated via a spacer 12a. Since the sub winding 4a and the sub winding 4b form the parallel circuit and have a small potential difference, the spacer 12a does not require such an isolating resistance as a wall insulation 13a. Further, the sub winding 4a, the sub winding 4b and the spacer 12a are applied an insulation to the earth by the wall insulation 13a so as to construct the armature winding 1. In the same manner, the sub winding 5a and the sub winding 5b are electrically isolated via the spacer 12b, and the sub winding 5a, the sub winding 5b and the spacer 12b are applied an insulation to the earth by a wall isolation 13b so as to construct the armature winding 2. The armature winding 1 and the armature winding 2 are accommodated in a slot 14 together with spacers 16a, 16b and 16c, and are structured such as to be fixed by a wedge 17.

In FIG. 7, two layers of armature windings are accommodated in one slot, however, the present invention can be applied to a rotating machinery in which one layer of armature winding is accommodated in one slot, and a rotating machinery in which two or more layers of armature windings are accommodated in one slot.

Figure 17:
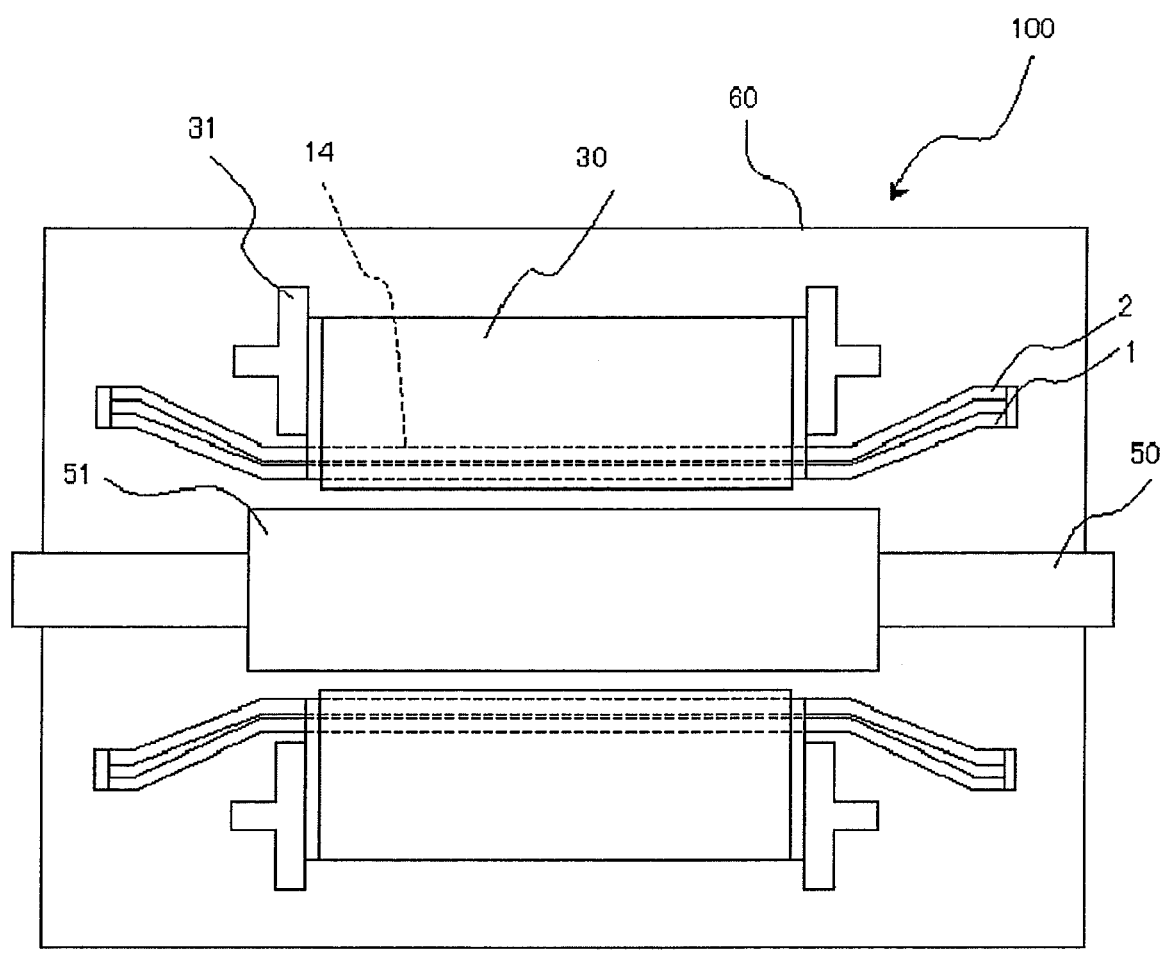
FIG. 17 illustrates a rotating machinery in accordance with the invention.

FIG. 17 illustrates a rotating machinery 100, which includes a rotor shaft 50, a rotor body 51, and a stator core 30 inside of a stator frame 60. The stator core 30 has a plurality of slots extending in an axial direction in an inner circumferential portion. The rotating machinery further includes armature winding 1 and armature winding 2, each winding having a plurality of strands 3 within a slot 14. The rotating machinery further includes a clamping plate 31.

Embodiment 2

Figure 9:
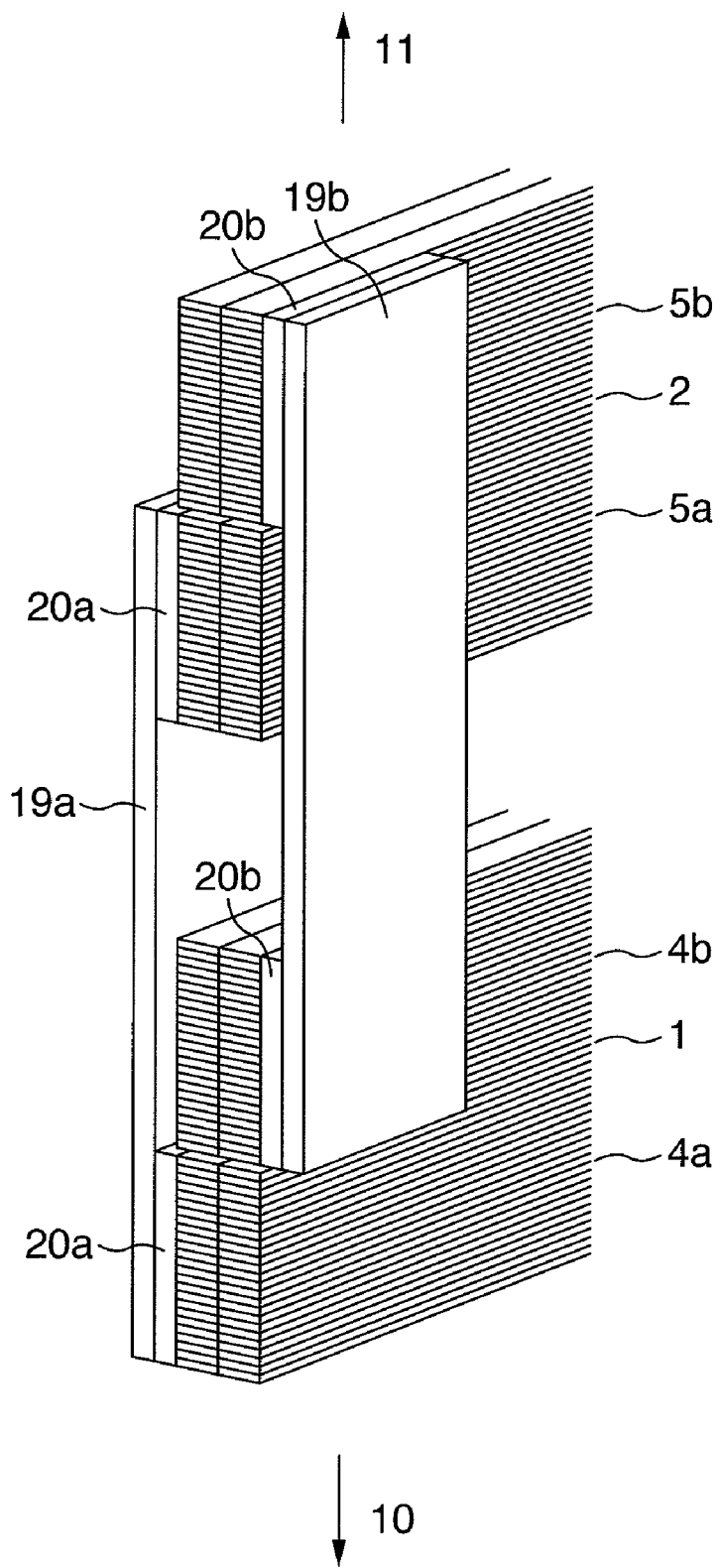
FIG. 9 is a perspective view of an armature winding end portion showing a second embodiment in accordance with the present invention.
Figure 10:
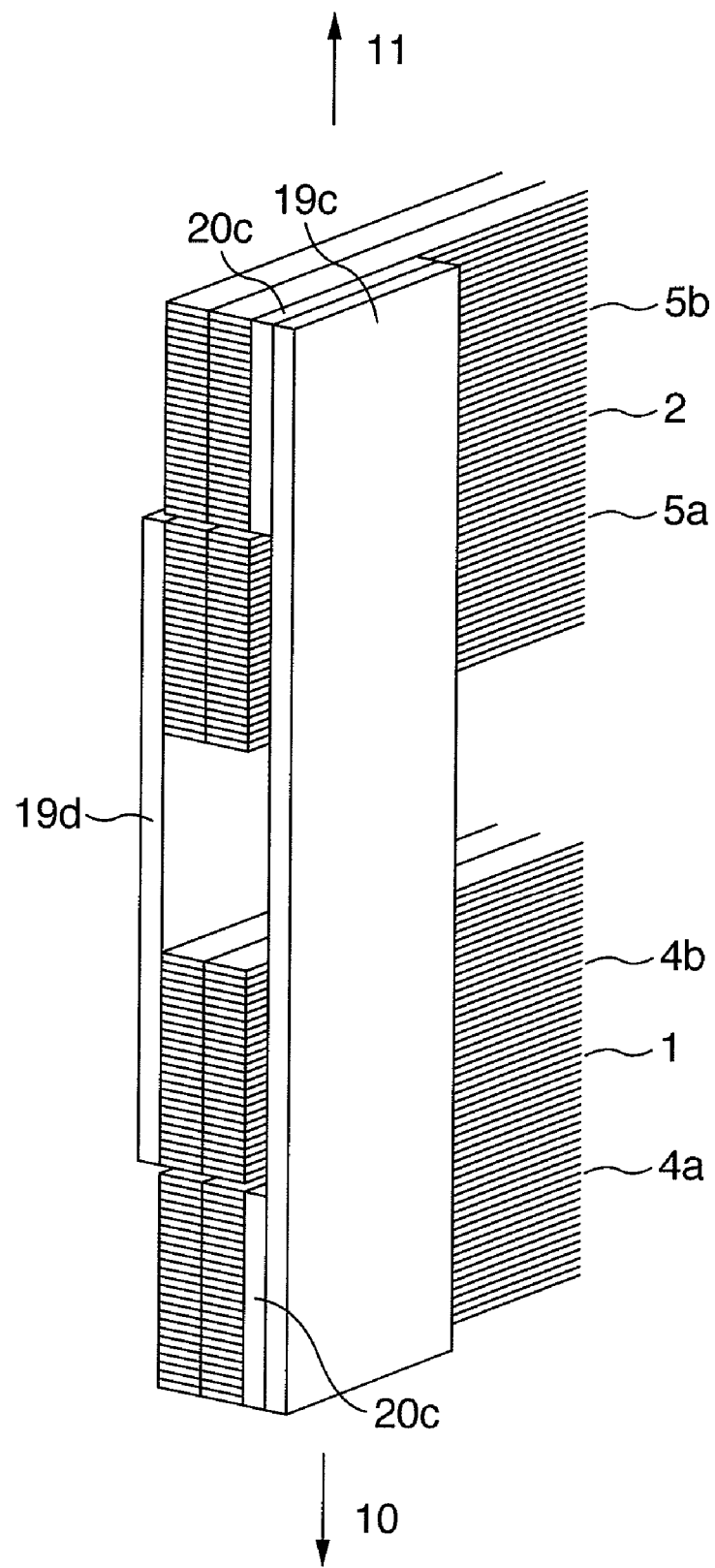
FIG. 10 is a perspective view of an armature winding end portion showing the second embodiment in accordance with the present invention.

FIGS. 9 and 10 are perspective views of an armature winding end portion showing a second embodiment in accordance with the present invention.

The embodiment in FIGS. 9 and 10 is different in a shape of the connector from the embodiment in FIGS. 1 and 2. The embodiment in FIGS. 1 and 2 is formed in the stepped structure in such a manner as to prevent the connector from being brought into contact with the other sub windings to which the connector is not connected.

The embodiment in FIG. 9 shows a second embodiment of the positive connection, and is structured such that a connector 19a is formed in a flat plate shape, a connection spacer 20a is provided between the connector 19a and the sub winding 4a, a connection spacer 20a is also provided between the connector 19a and the sub winding 5a, and the connector 19a, the connection spacer 20a and the sub winding 4a, and the connector 19a, the connection spacer 20a and the sub winding 5a are respectively electrically connected by brazing or the like. With the structure mentioned above, the sub winding 4a and the sub winding 4b keep an electrical isolation. In order to more securely isolate, a spacer (not shown) may be provided between the connector 19a and the sub winding 4b. In the same manner, a connection spacer 20b is provided between the connector 19b and the sub winding 4b and between the connector 19b and the sub winding 5b, respectively, and these elements are respectively electrically connected by brazing or the like. In order to more securely isolate, a spacer (not shown) may be provided between the connector 19b and the sub winding 5a.

The embodiment in FIG. 10 shows a second embodiment of the negative connection, and is structured such that a connector 19c is formed in a flat plate shape, a connection spacer 20c is respectively provided between the connector 19c and the sub winding 4a and between the connector 19c and the sub winding 5b, and the connector 19c, the connection spacer 20c, the sub winding 4a and the sub winding 5b are respectively electrically connected by brazing or the like. With the structure mentioned above, the sub winding 4a and the sub winding 4b, and the sub winding 5a and the sub winding 5b respectively keep an electrical isolation. In order to more securely isolate, a spacer (not shown) may be provided between the connector 19c and the sub winding 4b and between the connector 19c and the sub winding 5a, respectively. Further, the sub winding 4b and the sub winding 5a are connected by a connector 19d. A connection spacer is not necessary for the connector 19d.

The same effects as those of FIGS. 1 and 2 can be expected in this embodiment.

Embodiment 3

Figure 11:
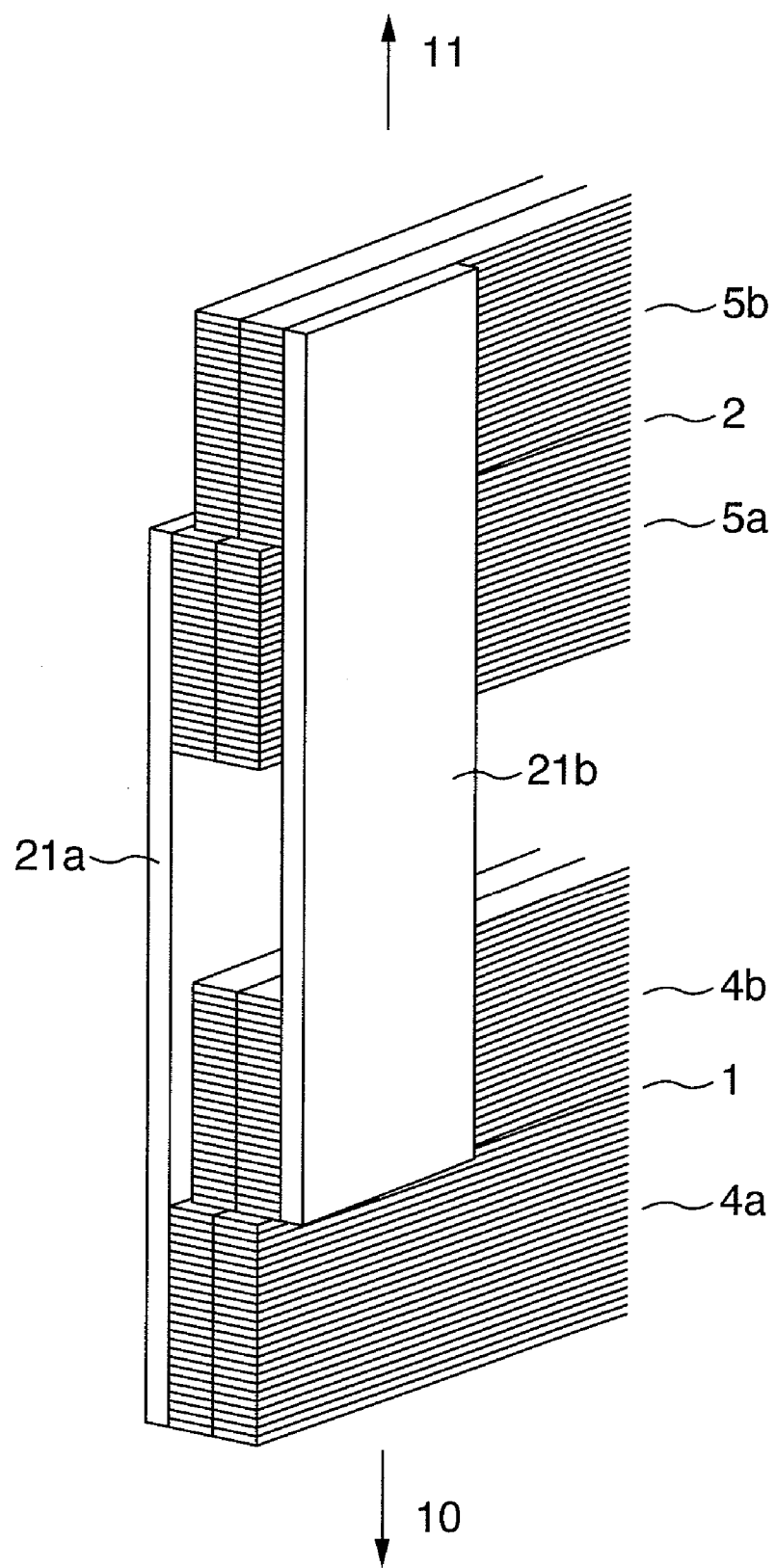
FIG. 11 is a perspective view of an armature winding end portion showing a third embodiment in accordance with the present invention.
Figure 12:
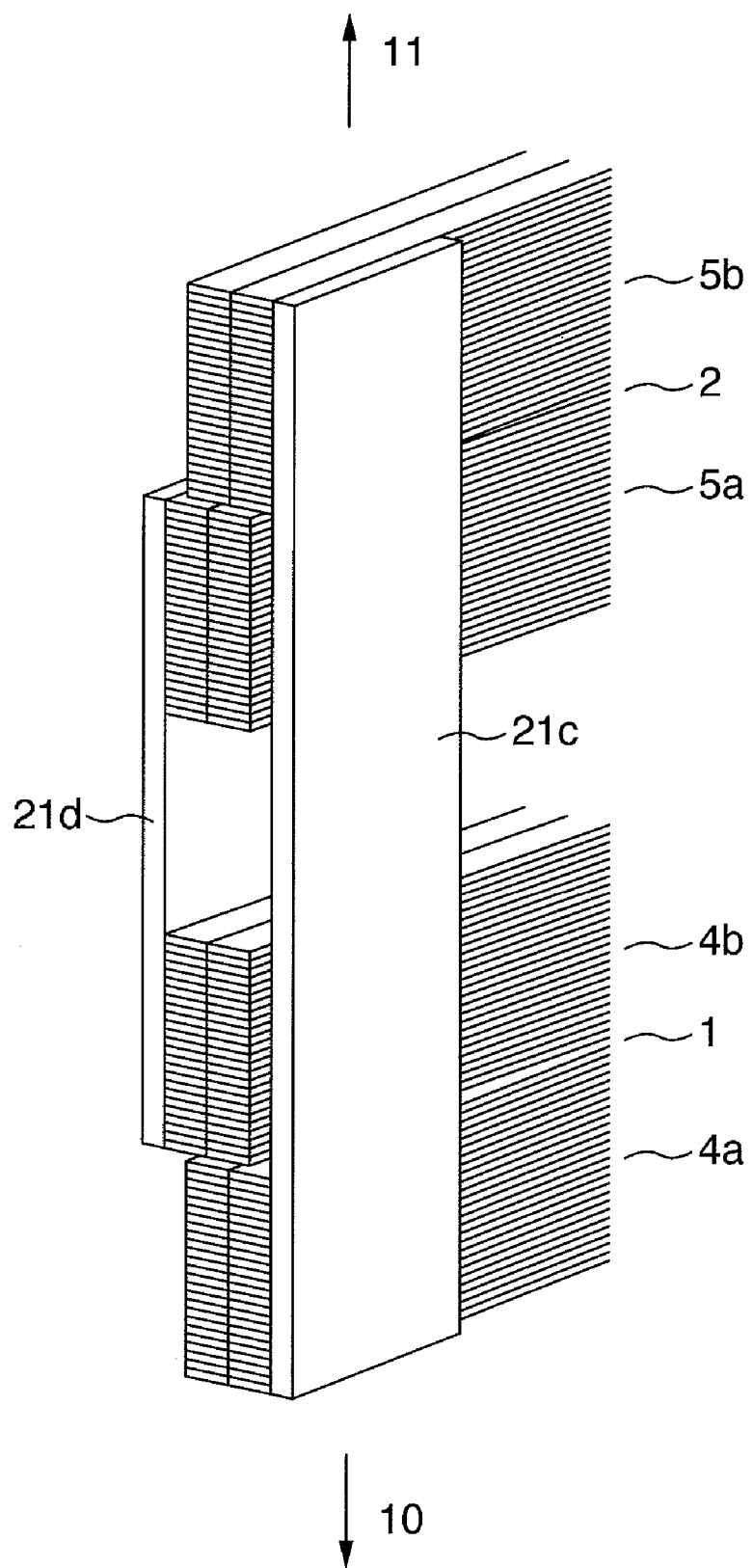
FIG. 12 is a perspective view of an armature winding end portion showing the third embodiment in accordance with the present invention.

FIGS. 11 and 12 are perspective views of an armature winding end portion showing a third embodiment in accordance with the present invention.

The embodiment in FIGS. 11 and 12 is different in a shape of the connector and a shape of the sub winding from the embodiment in FIGS. 1 and 2. The embodiment shown in FIGS. 1 and 2 is formed as the stepped structure in such a manner as to prevent the connector from being brought into contact with the other sub windings to which the connector is not connected.

The embodiment in FIG. 11 shows a third embodiment of the positive connection, and is structured such that a connector 21a is formed in a flat plate shape, and the sub winding 4a and the sub winding 5a are circumferentially bent in a direction of the connector 21a so as to be electrically connected to the connector 21a by brazing or the like. With the structure mentioned above, the sub winding 4a and the sub winding 4b keep an electrical isolation. In order to more securely isolate, a spacer (not shown) may be provided between the connector 21a and the sub winding 4b. In the same manner, the sub winding 4b and the sub winding 5b are circumferentially bent in a direction of a connector 21b so as to be electrically connected to the connector 21b by brazing or the like. In order to more securely isolate, a spacer (not shown) may be provided between the connector 21b and the sub winding 5a.

In the embodiment in FIG. 11, the sub winding 4a and the sub winding 5a are bent in the direction of the connector 21a, and the sub winding 4b and the sub winding 5b are bent in the direction of the connector 21b, however, the same effect can be obtained by bending any one of the sub winding 4a and the sub winding 5a or the sub winding 4b and the sub winding 5b.

The embodiment in FIG. 12 shows a third embodiment of the negative connection, and is structured such that a connector 21c is formed in a flat plate shape, and the sub winding 4a and the sub winding 5b are circumferentially bent in a direction of the connector 21c so as to be electrically connected to the connection piece 21c by brazing or the like. With the structure mentioned above, the sub winding 4a and the sub winding 4b, and the sub winding 5a and the sub winding 5b keep an electrical isolation. In order to more securely isolate, a spacer (not shown) may be provided between the connector 21c and the sub winding 4b and between the connector 21c and the sub winding 5a. Further, the sub winding 4b and the sub winding 5a are electrically connected by a connector 21d in accordance with brazing or the like.

In the embodiment shown in FIG. 12, the sub winding 4a and the sub winding 5b are circumferentially bent in the direction of the connector 21c, however, the same effects can be obtained by circumferentially bending the sub winding 4b and the sub winding 5a in the direction of the connector 21d.

The same effects as those of FIGS. 1 and 2 can be expected in this embodiment.

Embodiment 4

Figure 13:
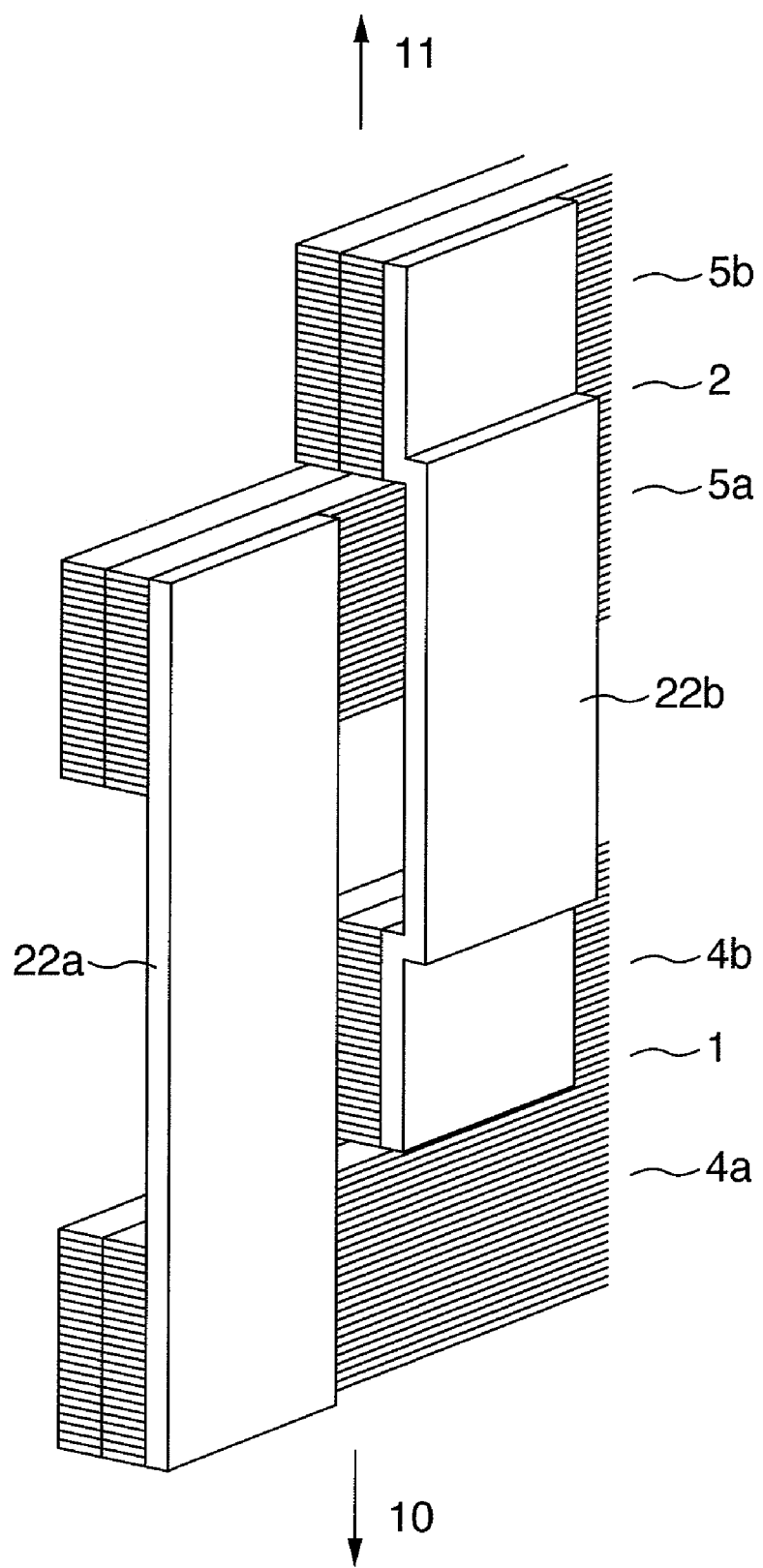
FIG. 13 is a perspective view of an armature winding end portion showing a fourth embodiment in accordance with the present invention.
Figure 14:
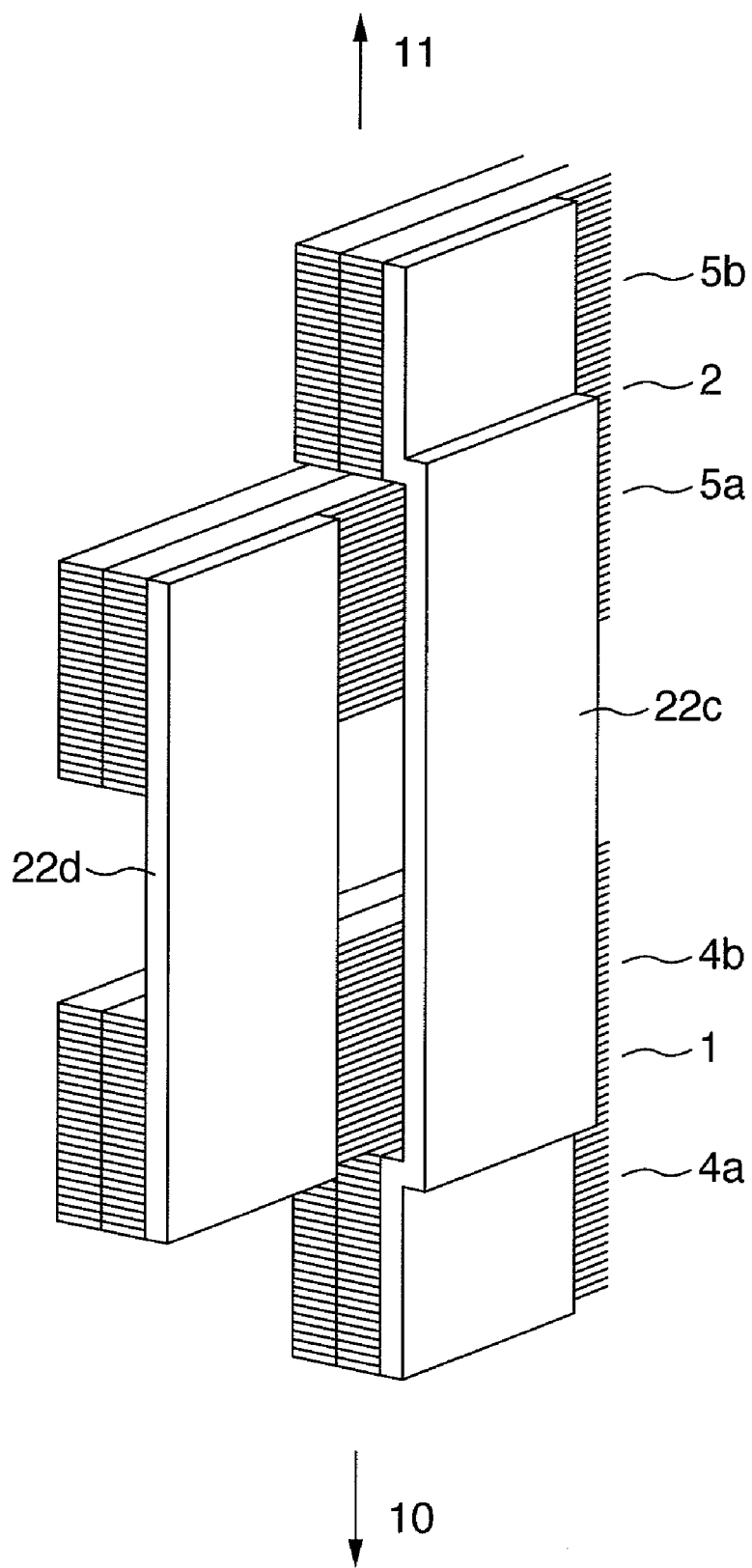
FIG. 14 is a perspective view of an armature winding end portion showing the fourth embodiment in accordance with the present invention.

FIGS. 13 and 14 are perspective views of an armature winding end portion showing a fourth embodiment in accordance with the present invention.

The embodiment in FIGS. 13 and 14 is different in a layout of the connector from the embodiment in FIGS. 1 and 2. In the embodiment shown in FIGS. 1 and 2, the connector is provided in both sides.

The embodiment in FIG. 13 shows a fourth embodiment of the positive connection, and is structured such that a connector 22a and a connector 22b are shifted back and forth in an axial direction, and the connectors are arranged on one side. The connector 22b is formed as a stepped structure, however, may be structured such that a connection spacer is provided as shown in FIG. 9, or a sub winding is bent as shown in FIG. 11. The back and forth positions of the connector 22a and the connector 22b may be set opposite to that of FIG. 13. In this case, the connector 22a is structured such that the isolation between the sub winding 4a and the sub winding 4b can be kept, for example, the stepped structure or the like. Further, in FIG. 13, the sub winding 4b and the sub winding 5b are set short in correspondence to the position of the connector 22b, however, may keep the same length as the sub winding 4a and the sub winding 5a.

The embodiment in FIG. 14 shows a fourth embodiment of the negative connection, and is structured such that a connector 22c and a connector 22d are shifted back and forth in the axial direction, and the connectors are arranged on one side. The connector 22c is formed as a stepped structure, however, may be structured such that a connection spacer is provided as shown in FIG. 10, or a sub winding is bent as shown in FIG. 12. The back and forth positions of the connector 22c and the connector 22d may be set opposite to that of FIG. 14. Further, in FIG. 14, the sub winding 4a and the sub winding 5b are set short in correspondence to the position of the connector 22c, however, may keep the same length as the sub winding 4b and the sub winding 5a.

The same effects as those of FIGS. 1 and 2 can be expected in this embodiment.

Embodiment 5

Figure 15:
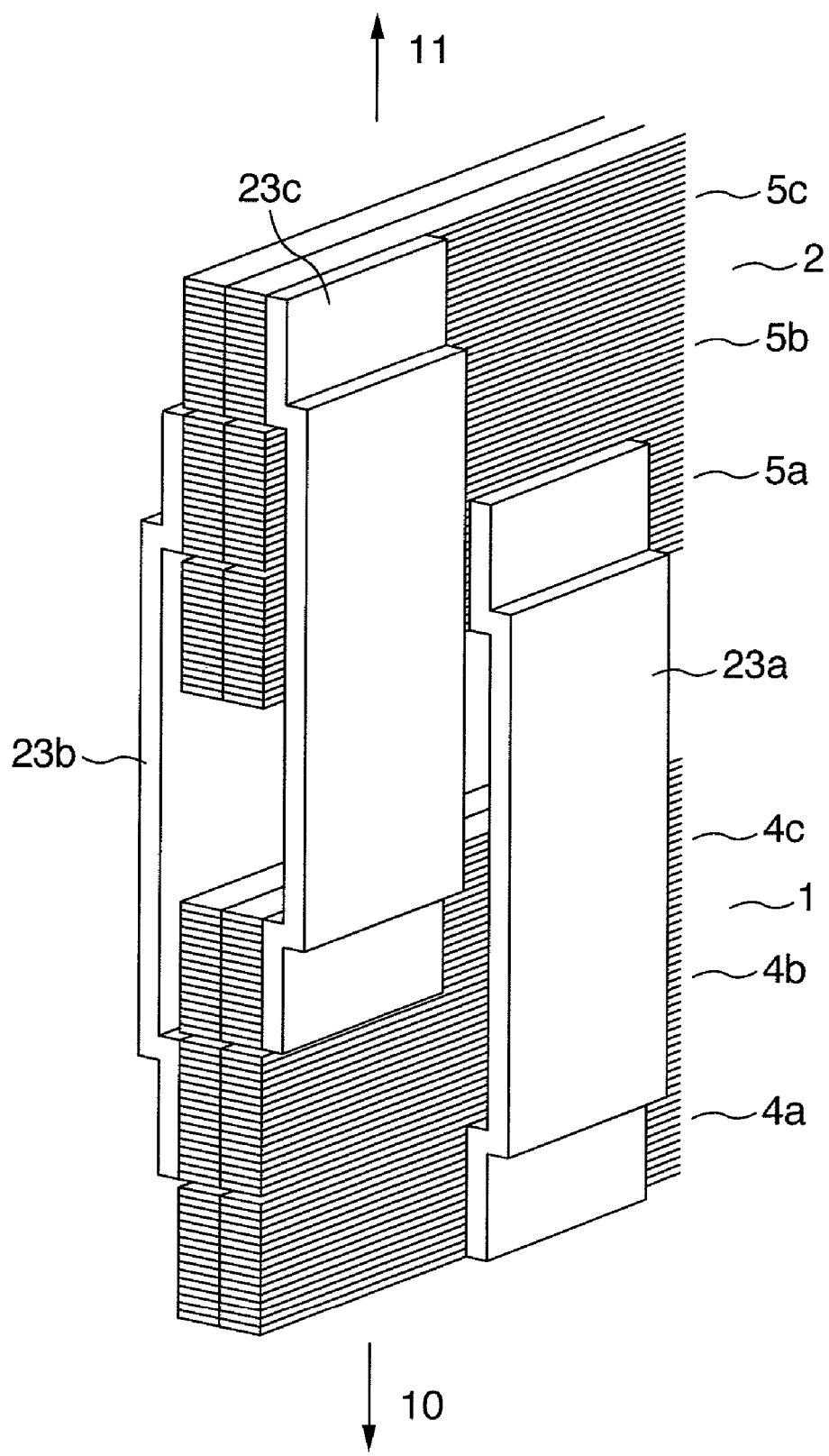
FIG. 15 is a perspective view of an armature winding end portion showing a fifth embodiment in accordance with the present invention.

FIG. 15 is a perspective view of an armature winding end portion showing a fifth embodiment in accordance with the present invention. The embodiment shown in FIG. 15 is different in a separating number of the armature winding from the embodiment shown in FIG. 1. In the embodiment shown in FIG. 1, the armature winding is separated into two sections in the vertical direction, and is constituted by two layers of sub windings.

The embodiment in FIG. 15 shows a fifth embodiment of the positive connection, and is structured such that the armature winding is separated into three sections in the vertical direction, and is constituted by three layers of sub windings. The armature winding 1 is constituted by a sub winding 4a, a sub winding 4b and a sub winding 4c, and the armature winding 2 is constituted by a sub winding 5a, a sub winding 5b and a sub winding 5c. The sub winding 4a and the sub winding 5a are electrically connected by a connector 23a, the sub winding 4b and the sub winding 5b are electrically connected by a connector 23b, and the sub winding 4c and the sub winding 5c are electrically connected by a connector 23c, respectively. In the structure of the two-layers sub winding, the connecting method is constituted by two kinds comprising the positive connection in FIG. 1 and the negative connection in FIG. 2, however, the structure of the three-layers sub winding in FIG. 15 has six kinds of connection methods (not shown). Since a combination of the connecting method is increased, it is possible to more cancel the linkage flux (not shown) between the sub windings in comparison with the case of the two-layers sub winding, and the loss reduction can be further expected.

The connector 23a, the connector 23b and the connector 23c are formed as the stepped structures in the same manner as those of FIG. 1, however, the structure may be made such that the connection spacer is provided as shown in FIG. 9, or the sub winding is bent as shown in FIG. 11.

The present embodiment is constituted by the three-layers sub winding, however, may be constituted by four or more layers of sub windings, or the separating number of the sub winding in the armature winding 1 may be different from that in the armature winding 2.

Embodiment 6

Figure 16:
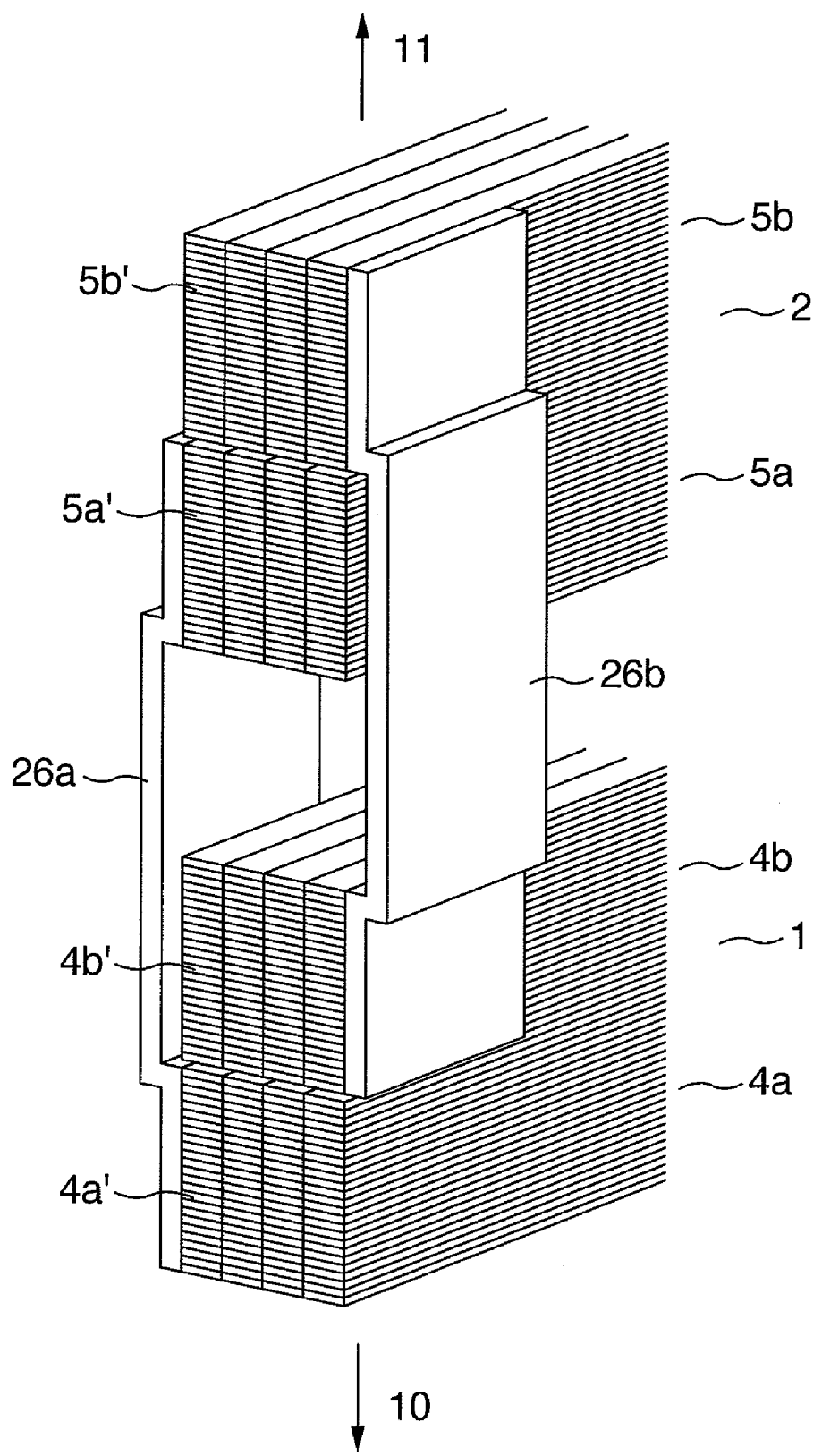
FIG. 16 is a perspective view of an armature winding end portion showing a sixth embodiment in accordance with the present invention.

FIG. 16 is a perspective view of an armature winding end portion showing a sixth embodiment in accordance with the present invention. The embodiment shown in FIG. 16 is different in a row number of the strands of the armature winding from the embodiment shown in FIG. 1. In the embodiment shown in FIG. 1, the armature winding is constituted by two rows of strands.

The embodiment in FIG. 16 shows a sixth embodiment of the positive connection, and is structured such that the armature windings 1 and 2 are constituted by four rows of strands. In a large capacity of rotating machinery, there is a structure in which some of the strands are constituted by a hollow strand (not shown), and a cooling medium is passed therethrough. In FIG. 16, the armature winding 1 is constituted by a sub winding 4a, a sub winding 4a', a sub winding 4b and a sub winding 4b', and the armature winding 2 is constituted by a sub winding 5a, a sub winding 5a', a sub winding 5b and a sub winding 5b'. The sub windings 4a and 4a' and the sub windings 5a and 5a' are electrically connected by a connector 26a, and the sub windings 4b and 4b' and the sub windings 5b and 5b' are electrically connected by a connector 26b. A negative connection (not shown) can be achieved by electrically connecting the sub windings 4b and 4b' and the sub windings 5a and 5a' by the connector, and electrically connecting the sub windings 4a and 4a' and the sub windings 5b and 5b' by the connector.

The connector 26a and the connector 26b are respectively formed as the stepped structure in the same manner as FIG. 1, however, may be structured such that the connection spacer is provided as shown in FIG. 9, or the sub winding is bent as shown in FIG. 11.

The present embodiment is structured by the armature winding constituted by four rows of strands, however, the same effects can be obtained by the armature winding constituted by six or more rows of strands.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A rotating machinery comprising:
   a rotor;
   a stator core provided with a plurality of slots extending in an axial direction in an inner circumferential portion;
   at least two armature windings, wherein each of the two armature windings is constituted by a plurality of strands within one of said plurality of slots;
   wherein each of said two armature windings comprises two sub windings separating said two armature windings into two layers in a vertical direction, and said sub windings are connected as to form a parallel circuit, and
   wherein said two armature windings construct the parallel circuit of said sub windings existing in said plurality of slots,
   wherein the rotating machinery further comprises:
   an armature winding positive connection portion having a connector connecting an end region of a sub winding on an inner diameter side of an inner diameter side armature winding and an end region of a sub winding on an inner diameter side of an outer diameter side armature winding, and a connector connecting an end region of a sub winding on an outer diameter side of the inner diameter side armature winding and an end region of a sub winding on an outer diameter side of the outer diameter side armature winding; and
   an armature winding negative connection portion having a connector connecting the end region of the sub winding on the inner diameter side of the inner diameter side armature winding and the end region of the sub winding on the outer diameter side of the outer diameter side armature winding, and a connector connecting the end region of the sub winding on the outer diameter side of the inner diameter side armature winding and the end region of the sub winding on the inner diameter side of the outer diameter side armature winding;
   wherein said parallel circuit is constructed by said positive connection portion and said negative connection portion in the armature windings.

2. A rotating machinery as claimed in claim 1, wherein in each of said sub windings, a transposition of the is independently formed.

3. A rotating machinery as claimed in claim 1, wherein a row number of the strands of said sub winding is at least two.

4. A rotating machinery as claimed in claim 1, wherein the armature windings construct the parallel circuit by said sub windings in phase neutral point to a line side.

5. A rotating machinery as claimed in claim 1, wherein a transposition angle of the strand of said sub winding is set to be equal to or more than 360 degrees.

6. A rotating machinery as claimed in claim 1, wherein said sub winding of said inner diameter side armature winding is connected to said sub winding of said outer diameter side armature winding by a connector in the end regions of the armature windings.

7. A rotating machinery as claimed in claim 5, wherein said sub winding is formed as a stepped structure.

* * * * *